United States Patent [19]

Konishi et al.

[11] Patent Number: 5,710,492

[45] Date of Patent: Jan. 20, 1998

[54] APPARATUS FOR MONITORING AND STABILIZING POWER SWING IN A POWER SYSTEM BY UTILIZING A POWER ELECTRONICS TECHNIQUE

[75] Inventors: Hiroo Konishi, Hitachinaka; Masahiko Amano, Hitachioota; Masahiro Watanabe; Masashi Nishimura, both of Hitachi, all of Japan

[73] Assignee: Hitachi, Ltd., Tokyo, Japan

[21] Appl. No.: 575,599

[22] Filed: Dec. 20, 1995

[30] Foreign Application Priority Data

Dec. 22, 1994 [JP] Japan ................. 6-319745

[51] Int. Cl.[6] .................... H02P 5/16; G05F 1/00
[52] U.S. Cl. .................... 318/156; 323/210
[58] Field of Search .................. 318/148, 149, 318/151–158, 702, 705, 716–719, 722, 611, 612, 623; 322/19, 21, 28, 25, 34; 323/205–211, 218

[56] References Cited

U.S. PATENT DOCUMENTS

| | | | |
|---|---|---|---|
| 3,991,352 | 11/1976 | Fry et al. | 318/278 |
| 3,992,661 | 11/1976 | Kelly, Jr. | 323/102 |
| 4,311,253 | 1/1982 | Putman et al. | 322/25 |
| 4,472,674 | 9/1984 | Yano et al. | 323/210 |
| 4,663,536 | 5/1987 | Roesel, Jr. et al. | 318/705 |
| 4,698,581 | 10/1987 | Shimamura et al. | 323/211 |
| 4,811,236 | 3/1989 | Brennen et al. | 323/210 |

OTHER PUBLICATIONS

IEEE, 1980, "Some Aspects of Transient Stability Improvement with Thyristor Controlled Dynamic Brake", Sarkar et al, pp. 1–7.

IEEE, 1992, "Thyristor Controlled Series Compensation Prototype Installation at the SLATT 1500 KV Substation", J. Urbanek et al, pp. 1–7.

IEEE, 1992, "Power Flow Control by Use of Controllable Series Components", M. Noroozian et al, pp. 1–8.

*Primary Examiner*—Jonathan Wysocki
*Attorney, Agent, or Firm*—Fay, Sharpe, Beall Fagan, Minnich & McKee

[57] ABSTRACT

In a power system wherein a plurality of power plants, load systems and power transmission components are connected to each other for increasing the power transmission capacity of the power system, the power system is stabilized and power swings are suppressed, by controlling a semiconductor switch used in a power system stabilizing apparatus which is provided at the power system in an applying manner adequately corresponding to its operation characteristics and function, in accordance with a stabilizing command signal generated by using state values (for example, voltage, current, power, frequency, phase angle) of the power system, detected by detecting circuits provided in the power system.

38 Claims, 9 Drawing Sheets

APPARATUS FOR MONITORING AND STABILIZING POWER SWING IN A POWER SYSTEM BY UTILIZING A POWER ELECTRONICS TECHNIQUE

BACKGROUND OF THE INVENTION

1. Field of the Invention

The present invention relates to a power system stabilizing apparatus for improving the capacity of power transmission of an existing power system, and especially to a power system in which a power electronics technique is applied.

2. Description of the Related Art

Recently, the demand for electric power has increased, but the constraints to the locations of power sources and the laying of transmission line systems having become more severe. The power which can be transmitted by a transmission line system depends on the stability of the power system (also referred to only as a system), and its value is as small as a half or one third of a power transmission limit determined from the heat capacity of a transmission line system. Mainly in Europe and U.S.A. a power electronics technique has been applied to transmit the power corresponding to the full heat capacity of a transmission line system. If such a technique succeeds, the power transmission ability of a transmission line system is improved without newly laying a transmission line. For example, since the inductance of a transmission line is large in a long distance line, the limit of the static power transmission is determined by the impedance of the transmission line. As one of the countermeasures to the large inductance, a series capacitor compensation method in which a power capacitor is serially inserted in a transmission, has been adopted to reduce the inductance and the apparent length of a transmission line. However, if a power capacitor is inserted, sometimes, an electrical serial resonance phenomenon is caused by the combination of the capacitance of the inserted capacitor and the inductance. If the resonance frequency comes near the specific relation with the mechanical characteristic frequency of a generator-turbine system, axis torsion of the generator-turbine system is caused. Especially, if a large capacitance is provided by the series capacitor, axis torsion is very likely caused, since the resonance frequency becomes lower and comes near the mechanical characteristic frequency of the generator-turbine system. That is, if a capacitor of large capacitance is provided in a transmission line for increasing the power transmission capacity of the transmission line, the probability of axis torsion occurrence becomes higher. Then, as to efforts to solve, the problem, several cases are reported in which a series capacitor of a small capacitance was used, or a series capacitor was used with some counter-actions to the problem. Further, abandoning the use of a series capacitor also has been reported.

By recent realization of a power semiconductor of a large power capacity, the high speed switching of a power component has become possible by applying such a power semiconductor. For example, it has been tried that the capacitance of a power capacitor is equivalently changed by connecting a reactor and a thyristor in parallel with the capacitor, and controlling a current flowing in the reactor. Then, since such a composition can change the electrical resonance frequency, it is possible to prevent axis torsion. If axis torsion of a generator-turbine system can be prevented, the power transmission capacity can be increased without newly laying a transmission line since the inductance of the transmission line system can be compensated by using a series capacitor of a large capacitance.

By representing the voltage of a sending end by Vs, the voltage of a receiving end by Vr, the impedance of a transmission line system by X and the phase difference between the voltages changes of the sending and receiving ends by θ, the transmitted power P in the transmission line system is expressed by the following acknown equation $$P = \frac{V_s \cdot V_r}{X} \sin\theta \quad (1)$$

Increasing the transmitted power in the transmission line system means increasing P of the above equation. In the above-mentioned series capacitor compensation method, the transmitted power is increased by decreasing X of the above equation. As other methods, the following methods are devised, i.e. the methods of controlling the effective power P itself, controlling Vs and Vr, and controlling θ. For example, a braking resistor is used for the method of controlling the effective power P, a reactive power compensating apparatus for the method of controlling Vr and Vs, and a phase shifter for the method of controlling θ. The high speed operations of the above-mentioned equipment can be realized by applying the power electronics technique to the equipment, but where and how to utilize such equipment has not been clearly disclosed yet.

The present invention provides a power system stabilizing apparatus capable of stabilizing a power system and suppressing power swings in the power system, by installing a system stabilizing unit including a semiconductor switch in a manner adequately according to the operation characteristics and the function of the system stabilizing unit in the power system, and by controlling the semiconductor switch, based on a system stabilizing command signal made by using the detected state values of the power system, in order to improve the transmission ability of the power system in which a plurality of power plants, load systems, and other transmission components are organically connected.

SUMMARY OF THE INVENTION

An object of the present invention is to increase the power transmission capacity of a power system in which a plurality of power plants, load systems, and other transmission components are organically connected.

To attain this object, The present invention provides a power system stabilizing apparatus comprising, means for stabilizing a power system, the stabilizing means including a semiconductor switch which is installed in a manner adequately according to the operation characteristics and the function of the stabilizing means, means for detecting state values(voltage, current, power, frequency, phase, etc.) of the power system, means for generating a system stabilizing command signal made by using the detected state values and means for controlling the semiconductor switch based on the system stabilizing command signal.

In order to increase the transmission capacity of the power system in which a plurality of power plants, load systems, and other transmission components are organically connected, a system stabilizing unit including a semiconductor switch is used in a manner adequately according to the operation characteristics and the function of the system stabilizing unit, in the power system.

In the following, example compositions of the power system stabilizing apparatus of the invention are explained. At first, in the power system in which a plurality of power plants, load systems, and other transmission components are organically connected, an energy control type system stabilizing unit including a semiconductor switch is installed at a sending end of a power plant connected to the power system, in parallel with a transmission line. Next, in the power system in which a plurality of power plants, load systems, and other transmission components are organically connected, a voltage control type system stabilizing unit for controlling the voltage of the power system, including a semiconductor switch, is installed at a connection point of the load systems or the midway point between the power plants and the load systems connected via a transmission line system to the power system, in parallel with the transmission line system. Then, in the power system in which a plurality of power plants, load systems, and other transmission components are organically connected, an impedance or phase control type system stabilizing unit including a semiconductor switch, is installed at, at least one of a plurality of transmission lines connecting the power plants and the load systems, serially in the transmission lines. Further, in the power system in which a plurality of power plants, load systems, and other transmission components are organically connected, an impedance or control type system stabilizing unit including a semiconductor switch is installed at a transmission line of a large impedance, connected to a nuclear power plant or a thermal power plant, serially in the transmission line. Then, the semiconductor switch of the system stabilizing unit controls the power system based on the system stabilizing command signal made by using the detected state values (voltage, current, power, frequency, phase and change values of those ones) of the power system. Further, by operating the system stabilizing apparatus including the system stabilizing unit of the present invention within 3 cycles after the removal of an accident, the power system is stabilized and power swings are also suppressed.

Then, by stabilizing the power transmission in the anomaly or accident occurrence of a power system by the system stabilizing apparatus, the excess margin in the power transmission can be reduced and the usually transmitted power can be sent by the full power level corresponding to the heat capacity of the transmission line.

DETAILED DESCRIPTION OF THE EMBODIMENTS

Figure 1:
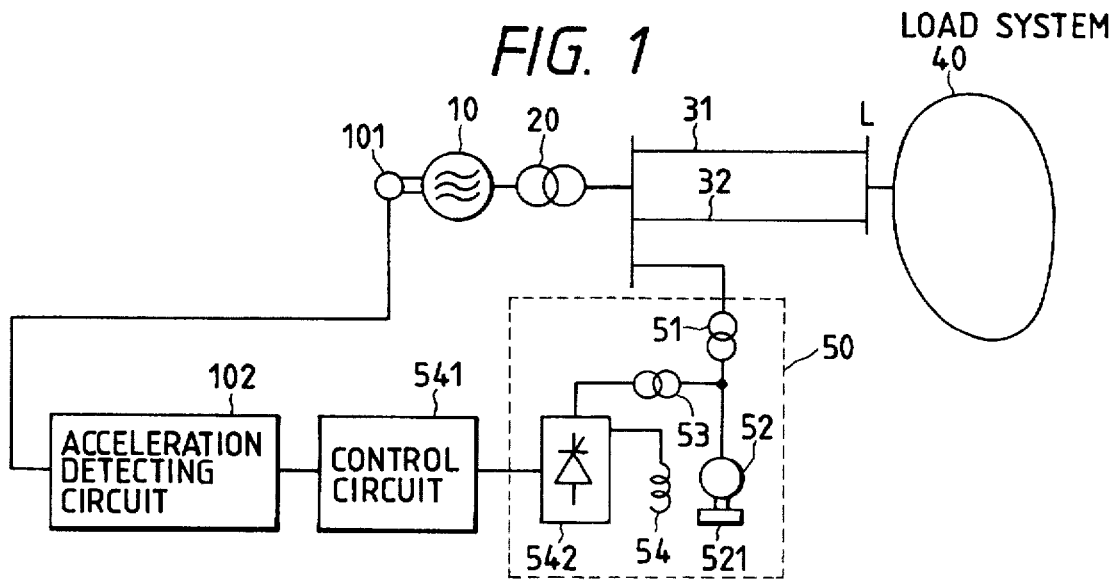
FIG. 1 shows an embodiment of the present invention wherein an energy control type system stabilizing unit is used.

An embodiment of the present invention is shown in FIG. 1. FIG. 1 shows a case wherein an energy control type system stabilizing unit is installed in a power system sending the power generated in a power plant to a load system via a transmission line system. Components or circuits which the numerals show in FIG. 1 are as follows: the numeral 10 indicates a generator, the numeral 20 a voltage rising transformer, the numerals 31 and 32 transmission lines for sending the power to a load system 40 including generators, and the numeral 50 a variable speed fly-wheel generator used as an energy control type system stabilizing unit, composed of a transformer 51 for connecting the variable speed fly-wheel generator to the power system, a generator 52 of variable speed operations, a fly-wheel 521 of the generator, a transformer 53 feeding the current for alternatingly exciting a field coil for a rotor of the generator, a field coil 54 of the generator, and a cycloconverter 542 for converting the frequency of a commercial power to the different frequency of the current for alternatingly exciting the field coil. And, the numeral 541 indicates a control circuit for controlling the cycloconverter 542, the numeral 101 a pilot generator for detecting the rotation speed of the generator, and the numeral 102 an acceleration detecting circuit for obtaining the acceleration/deceleration of the speed, based on the detected rotation speed of the generator.

Figure 3:
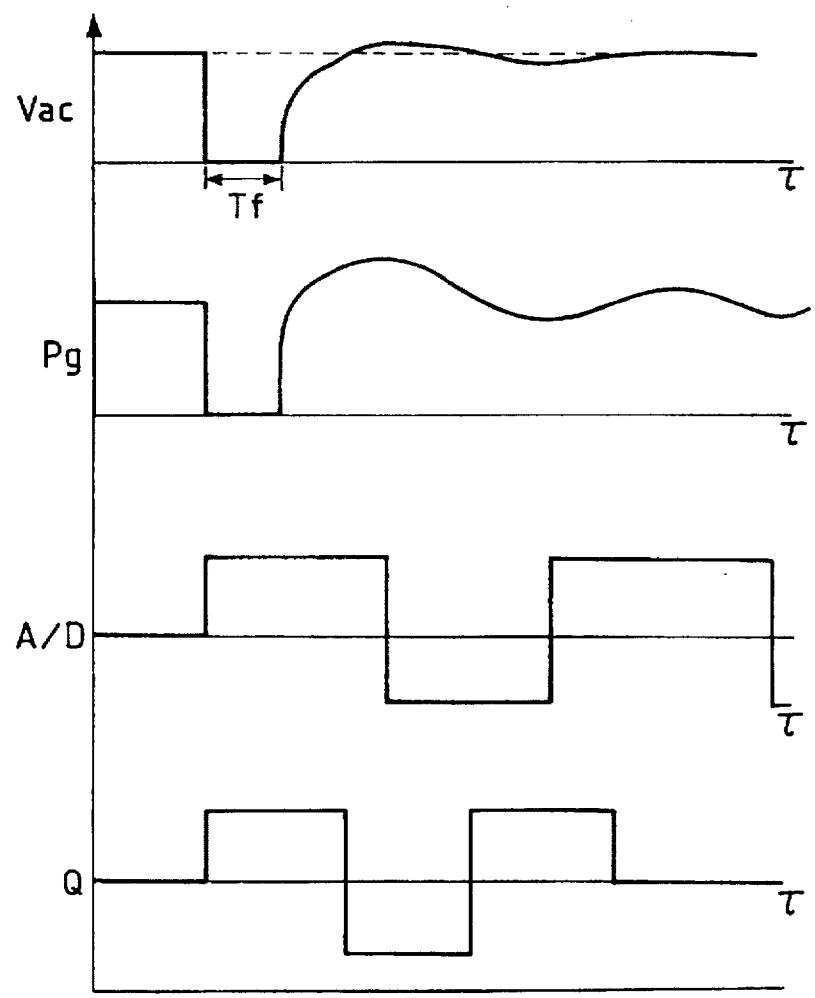
FIG. 3 is a figure for explaining operation of the system stabilizing apparatus.

The operation of the control unit is explained by using FIG. 3. In FIG. 3, the changes of the alternating voltage Vac of a sending end of a power plant in a ground fault occurrence in the transmission line 31 or 32, the changes of the generator output power Pg, the changes of the power accumulation/discharge signal A/D, and the changes of the reactive power control signal Q, are shown, respectively. Since the voltage of the sending end of a power plant is 0 during the ground fault period Tf, the generator output power also becomes 0. Then, since the mechanical input power becomes larger than the electrical output power in the generator, the rotation speed of the generator is accelerated. If the ground fault is removed, the alternating voltage is recovered in accordance with the power system characteristics. Since the output power of the generator is also recovered if the alternating voltage is recovered, the accumulated energy during the ground fault period in the generator is discharged and the generator output power settles to a new steady level as oscillating, if the system keeps its stability.

In such a case, the variable speed fly-wheel generator can improve the transient stability of the power system, by receiving the energy from the power system in the acceleration state of the generator and by discharging the energy to the power system in the deceleration state of the generator. In the embodiment shown by FIG. 1, the pilot generator 101 and the acceleration detecting circuit 102 are provided. The pilot generator outputs the voltage proportional to the rotation number of the generator 10, and the acceleration detecting circuit differentiates the output voltage with respect to time. From the differentiated value, the changes of the energy accumulation/discharge signal A/D are obtained as shown in FIG. 3. When the signal A/D is positive, that is, the generator is accelerated, the variable speed fly-wheel generator receives the energy from the generator, and when the signal A/D is negative, that is, the generator is decelerated, the fly-wheel generator discharges the energy to the generator. Then, the fly-wheel generator is operated so as to receive or discharge the energy, based on the signal A/D. The operations are achieved by controlling the ignition If the phase cycloconverter 542. If the phase of the output alternating voltage of the variable speed fly-wheel generator is advanced from the phase of the voltage of the power system by increasing the frequency of the alternating excitation voltage for the cycloconverter, the energy flows from the fly-wheel generator to the power system, and vice versa.

Although the on-off operation of the variable speed fly-wheel generator is above-explained for receiving/discharging the energy, of course, it is possible to change the received or discharged energy of the fly-wheel generator continuously in proportion to the differential value detected by the acceleration detecting circuit 102. Then, the cycloconverter is applied for the alternating excitation of the variable speed fly-wheel generator in the above explanation. Further, an inverter composed of a power device such as a GTO (Gate Turn-off Thyristor) having the self-extinction function, an IGBT (Insulated Gate-turn-off Bipolar Transistor), etc., is also available for the alternating excitation of the fly-wheel generator. Then, the pilot generator 101 used as the acceleration detecting circuit of the generator is provided at the axis of the generator, since the power system stabilizing apparatus is installed near the generator of a power plant. Of course, although it is possible to detect the acceleration of the generator by using a detected voltage or current of an alternating current bus, such a detection method has a problem that, in an accident of the power system, since the waveforms of the alternating voltage or current are disordered or distorted, the acceleration of the generator is not correctly measured, besides a problem of the S/N ratio. In the embodiment, since the power system stabilizing apparatus is installed at or near a power plant, it is also possible to detect the acceleration of the generator by using a photo-sensor for detecting the rotation number of the generator. This method as well as the method using the pilotconverter does not have the problem of the S/N ratio and the problem of the incorrect measurement in an accident of the power system.

Although the power system stabilizing apparatus shown in FIG. 1 stabilizes the power system by executing the energy (effective power) control, it is possible to realize more effectual stabilization of the power system by using a system stabilizing unit having the function of controlling the reactive power besides the effective power, for example, the above-mentioned fly-wheel generator or a superconduction magnetic energy storage facility (SMES) which can control both the effective and reactive power. In the control method of both of the effective and reactive power, the alternating voltage Vac shown in FIG. 3 is adjusted so as to keep a constant value, by controlling the reactive power. That is, when the system stabilizing unit discharges the energy to the power system, since the voltage of the power system becomes higher, the system stabilizing unit decreases the voltage of the power system by discharging the lag reactive power, and when the system stabilizing unit absorbs the energy from the power system, since the voltage of the power system becomes lower, the system stabilizing unit increases the voltage of the power system by discharging the lead reactive power. By this method, it is possible to stabilize the power system further better.

As mentioned above, in an accident occurrence also, since the power system can be stably operated by the power system stabilizing apparatus in which the energy control type system stabilizing unit is used and installed at the sending end of a power plant, it is possible to increase the usual transmitted power. Further, by aplying the power electronics technique to a power system stabilizing apparatus, the power system stabilizing apparatus can be operated immediately or in a short time if the alternating voltage is recovered after the removal of the accident. That is, in an accident occurrence, the time required from the accident detection to the removal of the accident which is carried out by a circuit breaker is at most the interval of 4 cycles, and, on the other hand, the apparatus to which the power electronics technique is applied can be started within almost 3 cycles during the accident since an operation of any mechanical component is not necessary in such a apparatus. Therefore, this apparatus can operate the power system more stably than a power system stabilizing apparatus using the conventional device such as a mechanical type circuit breaker, in which it takes the interval of 6 cycles to start the power system stabilizing apparatus.

The signals used for controlling the power system stabilizing apparatus are signals of the state values of the object power plants, load systems, etc., i.e., voltage, current, power, phase angle, angular speed, and frequency, and differential quantities of those values.

The reason why the power system stabilizing apparatus using the energy control type system stabilizing unit is adequate in the power transmitting system constitution as shown in FIG. 1 is that the power system stabilizing apparatus using the energy control type system stabilizing unit has the function of absorbing/discharging the energy of the generator, which is needed to prevent the system instability caused by the interruption of the energy flow from the generator in an accident of a transmission line through which the power output by the generator is transmitted to the load systems.

As the energy control type system stabilizing unit to which the power electronics technique is applied, besides the variable speed fly-wheel generator, a braking resistor controlled by semiconductor devices, a superconduction magnetic energy storage facility (SMES), etc., are available. Although the braking resistor can absorb but not discharge the energy, it is still effective for stabilizing the power system.

Figure 2:
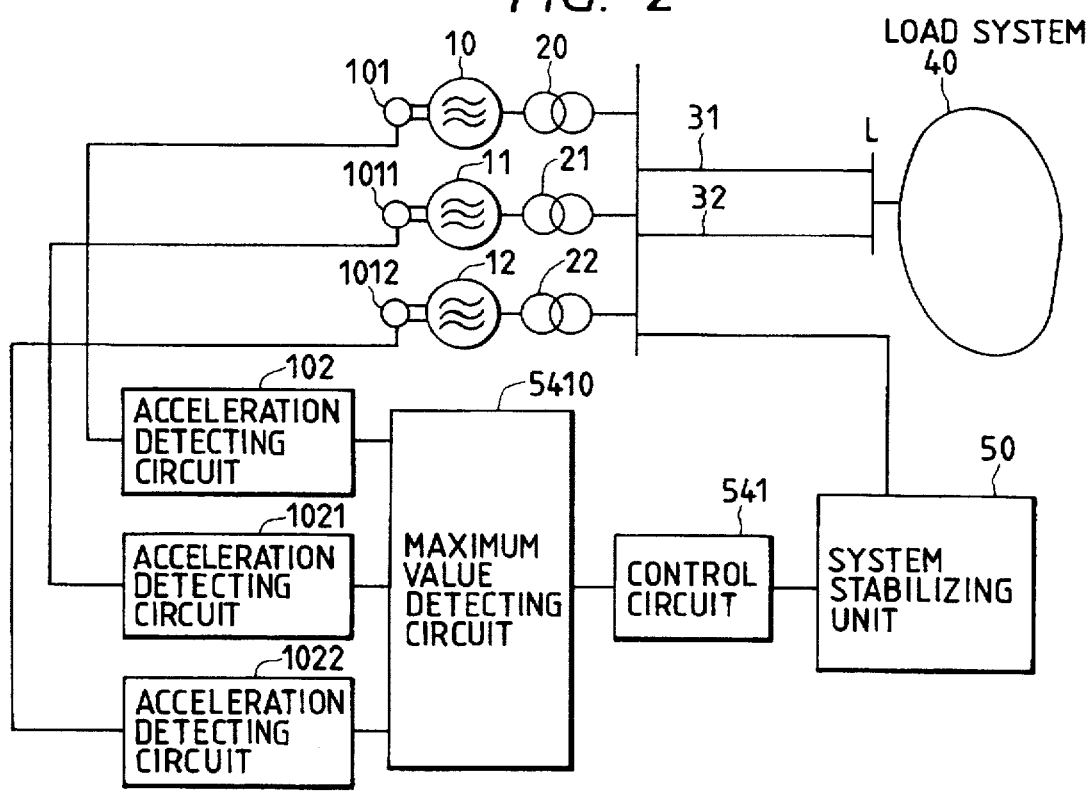
FIG. 2 shows an embodiment of the present invention wherein an energy control type system stabilizing unit is applied to a power system including a plurality of generators.

Then, although the power system stabilizing apparatus can be connected to the output terminal of the generator, it is favorable that the stabilizing apparatus is connected to the alternating current bus of the sending end, since receiving/discharging the energy of the generator can be carried out by one power system stabilizing apparatus even if a plurality of generators are provided in the power plant. An example system constitution of such a case is shown in FIG. 2. The numerals not shown in FIG. 1 but in FIG. 2 are explained in the following. The numerals 11 and 12 indicate generators, the numerals 21 and 22 voltage rising transformers, and the numerals 1011 and 1012 pilot generators, each of them detecting the rotation speed of each of the generators 11 and 12. And, the numerals 1021 and 1022 indicate acceleration detecting circuits, each of them detecting the acceleration of each of the generators 11 and 12 by using the detected rotation speed, and the numeral 5410 a maximum value detecting circuit for detecting the maximum absolute value of the detected acceleration values. The operation of this embodiment is almost the same as the operation of the embodiment shown in FIG. 1, but different in that receiving/discharging the energy is controlled based on the maximum absolute value of the detected accelerations of the plurality of generators. That is, the energy is absorbed by the power system stabilizing apparatus, corresponding to the generator indicating the maximum acceleration, and the energy is discharged by the power system stabilizing apparatus, corresponding to the generator indicating the maximum absolute value of deceleration. By the above-mentioned operation, the power system including a plurality of generators can be stabilized by one power system stabilizing apparatus. The reason why the energy is absorbed or discharged corresponding to the generator having the largest absolute value of the acceleration or the deceleration is that the stabilty of the power system is determined by the operation of the generator having the maximum phase shift, namely, the largest absolute value of the acceleration or the deceleration. Since a generator of a small power capacity operates in accordance with a generator of a large power capacity, although, generally, a generator of a small capacity indicates the maximum absolute value of the acceleration or the decleration, such a control is adequate to the system including a plurlity of generators having the same power capacity.

The usual transmission power capacity is generally determined by the transient stability of a transmission line system, and the maximum power to be transmitted by the transmission line system is determined by the static stability of the line system. Therefore, if it is intended that the transmission power is increased to the maximum power determined by the static stability, the power capacity required for the power system stabilizing apparatus is the capacity equal to the difference between the capacity determined by the static stability and the capacity determined by the transient stability. Generally, if it is intended to increase the transmission power by applying a power system stabilizing apparatus, the stabilizing apparatus needs to have the power capacity more than the capacity to be increased.

Figure 4:
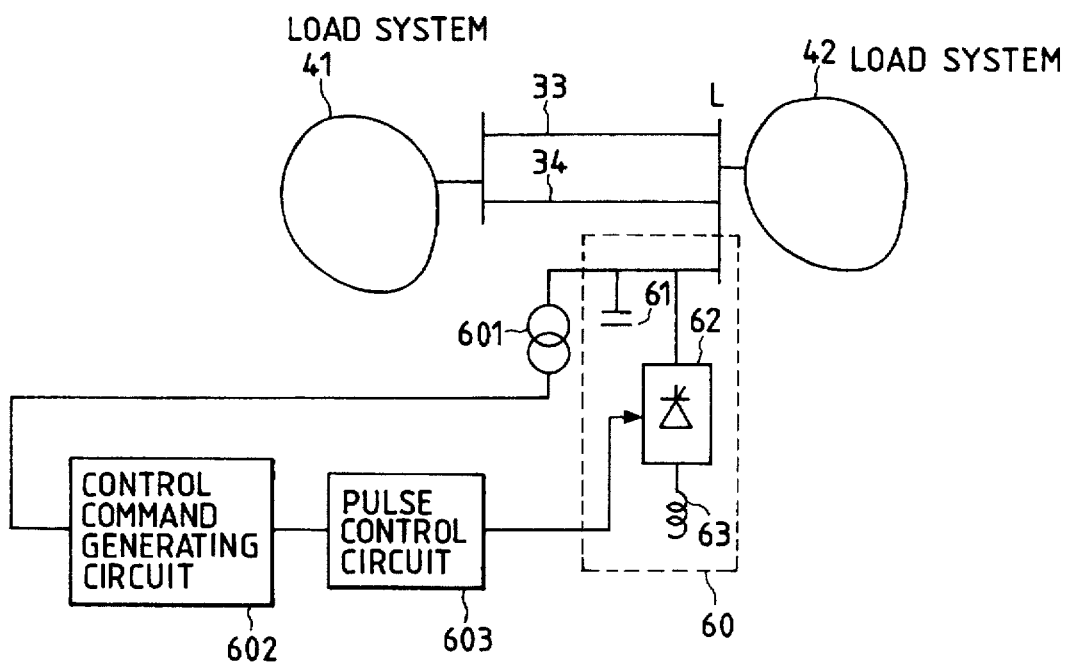
FIG. 4 shows an embodiment of the present invention wherein a voltage control type system stabilizing unit is used.

Another embodiment is shown in FIG. 4. In the power sending system constitution of the embodiment shown in FIG. 4, in which load systems including power sources are connected by a transmission line system, a static type var compensating unit is installed at a load system connecting point, as the voltage control type system stabilizing unit for stabilizing the system voltage. In the figure, the numerals 41 and 42 indicate load systems including power sources, the numerals 33 and 34 transmission lines, and the numeral 60 a static type var compensating unit (SVC) as an example of the voltage control type system stabilizing unit, which is composed of a power capacitor 61 for receiving the lead power from the power system and a thyristor inverter 62 for controlling the current flowing in a reactor 63 for receiving the lag power from the power system. And, the numeral 601 indicates a voltage transformer for detecting the voltage of the load system connecting point, the numeral 602 a control command generating circuit for generating an ignition command for the thyristor inverter 62, which commands the increase of a current in the reactor 63 if the detected voltage is higher and otherwise the decrease of the current, on the basis of the judgment whether the detected voltage at the connection point is higher than the prescribed value or not, and the numeral 603 a pulse control circuit for controlling the thyristor inverter.

Figure 14:
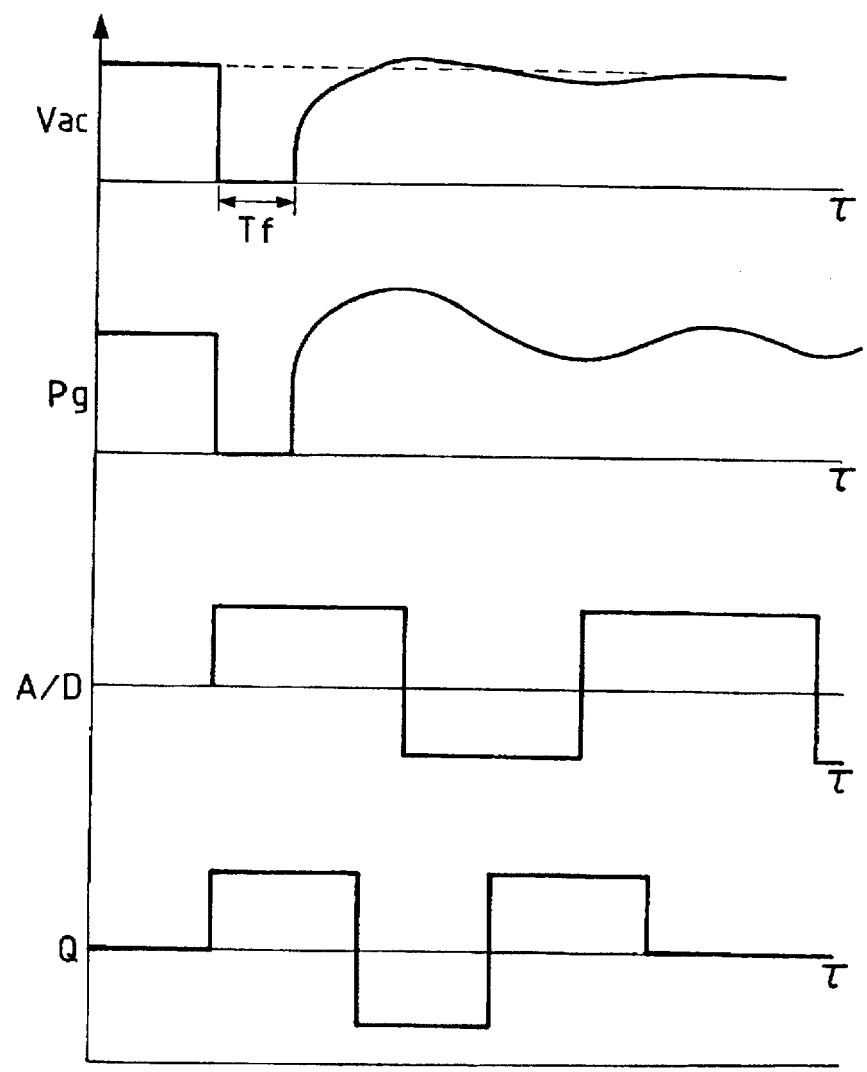
FIG. 14 is a figure for explaining operation of the system stabilizing apparatus.

The operations of this embodiment is explained by referring to FIG. 14. Supposing that a ground accident occurs at the transmission line 33 or 34 and the Vac indicates the voltage of the load system connection point L, the control command generating circuit 602 generates such a control command that the lead reactive power is received by the stabilizing unit if the Vac is higher than the prescribed level expressed by the dash line in the figure and otherwise the lag reactive is received. An example control command signal is shown by a reactive power control signal Q in FIG. 14. The positive Q expresses the control of receiving the lead reactive power, and the negative Q the control of receiving the lag reactive power. The control of receiving the lead or lag reactive power is executed by adjusting the current flowing in the reactor by controlling the ignition angle of the thyristor inverter. That is, in generating the lead reactive power, the ignition angle is delayed to decrease the current of the reactor 63, and vice versa. Then, the reactive power is adjusted by such a bang-bang control as shown by the change of the Q in FIG. 14. Further, of course, it is possible to control the reactive power in proportion to the difference between the system voltage and the prescribed level. Then, since the system stability is improved by the above-mentioned control of the reactive power, the usual transmission power via the transmission lines 33 and 34 can be increased. Further, by applying the power electronics technique to a power system stabilizing apparatus, the power system stabilizing apparatus can be operated immediately or in a short time (for example, within 3 cycles) if the alternating voltage is recovered after the removal of the accident. Therefore, this apparatus can operate the power system more stably than a power system stabilizing apparatus using the conventional device such as a mechanical type circuit breaker, in which it takes 6 cycles to start the power system stabilizing apparatus.

The reason why the voltage control type system stabilizing unit is effective to the stabilization of the power system in the power transmitting system constitution of the embodiment shown in FIG. 4 is that a loss of synchronism due to the interruption of the energy flow from the generator, which occurs in the system constitution shown in FIG. 1, does not occur in the system constitution shown in FIG. 4 since the two load systems connected to each other by the transmission line system is stabilized by controlling the voltage of the transmission lines so as to keep a constant value.

As the voltage control type system stabilizing unit to which the power electronics technique is applied, besides the above-mentioned SVC, a self-excited var compensation generator (SVG), a thyristor control parallel capacitor (TSC), etc., are also applicable.

Figure 5:
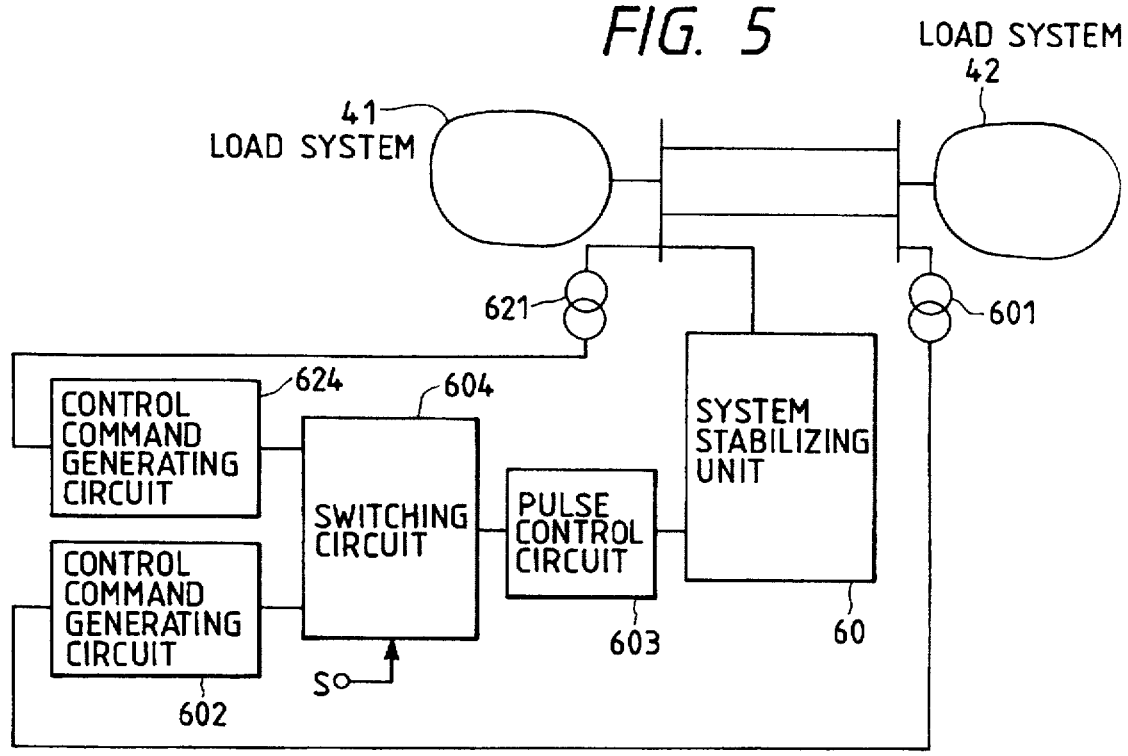
FIG. 5 shows an embodiment of the present invention wherein a voltage control type system stabilizing unit is used and controlled by using voltage signals of load systems.
Figure 6:
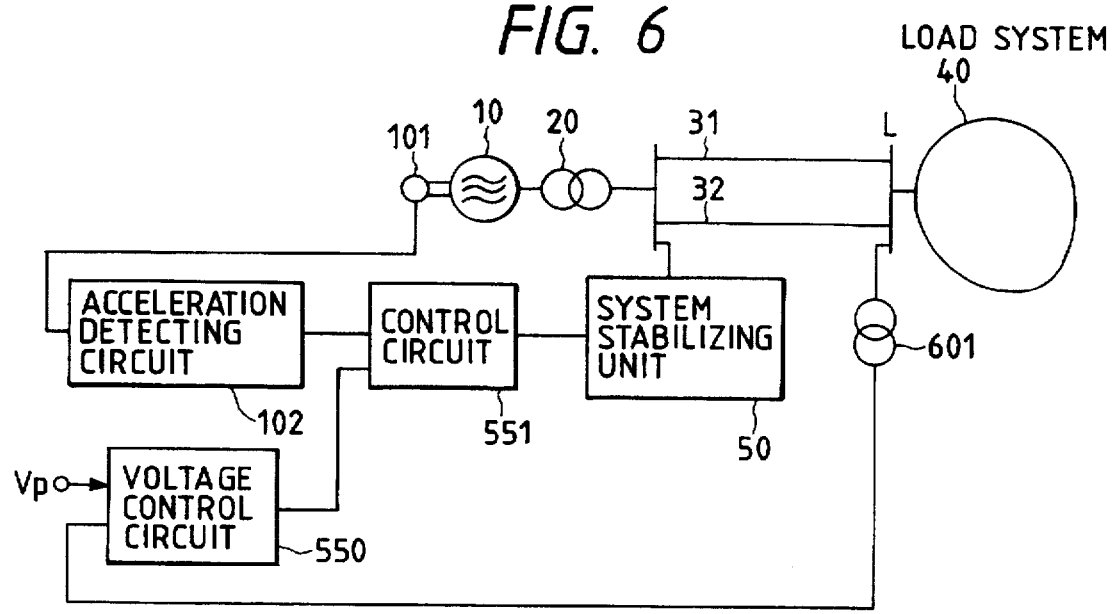
FIG. 6 shows an embodiment of the present invention wherein an energy control type system stabilizing unit is used and controlled by using voltage signals of a load system and a sending end.

In FIG. 5, a modification of the embodiment in FIG. 4 is shown. Although the system stabilizing unit 60 is connected to the alternating current bus to which the load system 42 is connected, in FIG. 4, the system stabilizing unit is connected to the alternating current bus of the other load system 41, and an input signal used for generating the control signal is obtained from the alternating current bus of the load system 42 (the load system connection point), in FIG. 5. The operation of this embodiment is the same as the operation of the one shown in FIG. 4. The effect of the voltage control in this embodiment is lower than the embodiment shown in FIG. 4 since the voltage of the load system is controlled via the transmission lines 33 and 34. Then, this embodiment is suitable for the case wherein the area enough to install the system stabilizing unit 60 at the alternating current bus of the load system 42 can not be prepared, or the case wherein it is intended to use the system stabilizing unit for stabilizing the load system 41 too. For the latter case, the system stabilizing unit is controlled by using the signal sent from the load system 41. The numerals shown in FIG. 5 except ones in FIG. 4 are explained in the following. The numeral 621 indicates a voltage transformer for detecting the voltage of the alternating current bus of the load system 41 (the voltage at the load system connection point), the numeral 624 a control command generating circuit for generating the ignition command to keep the voltage at the load system connection point within the prescribed voltage range, on the basis of the judgment on whether the detected voltage is higher than the prescribed level or not, and the numeral 604 a switching circuit which selects one of the two output signals from the command generating circuits 602 and 624 as an input signal to the pulse control circuit 603 in accordance with a signal S from a commanding circuit not shown in the figure. The operation of this embodiment is the same as the embodiment shown in FIG. 4 except that the input signal different from the one used in the embodiment shown in FIG. 4 is input to each control command generating circuit. By this embodiment, the voltage values in both of the load systems 41 and 42 can be stabilized. By using the system stabilizing unit having also the voltage control function besides the energy control function, for example, the fly-wheel generator which can control the effective power (energy) and the reactive power (voltage) in the power transmission system constitution of the embodiment shown in FIG. 5, the voltage of the load systems also can be controlled and stabilized. Since, generally, such a system stabilizing unit can control separately the effective power and the reactive power, the effective power is controlled by adopting the power transmitting system constitution shown in FIG. 1, and the reactive power is further controlled by the voltage signal of the load system as shown in FIG. 4. Such an example system constitution is shown in FIG. 6. In the figure, a cycloconverter control circuit 551 uses the output signal of the acceleration detecting circuit 102 as a signal for controlling the absorption/discharge of the effective power, and provides a pulse signal for controlling the reactive power by using the output signal of the voltage control circuit (or a reactive power control circuit), obtained based on the difference between the output signal of the voltage transformer 601 and the prescribed voltage level Vp, which is input to the cycloconverter 542. In this embodiment, the cycloconverter is replaced for the above-mentioned GTO inverter.

Figure 7:
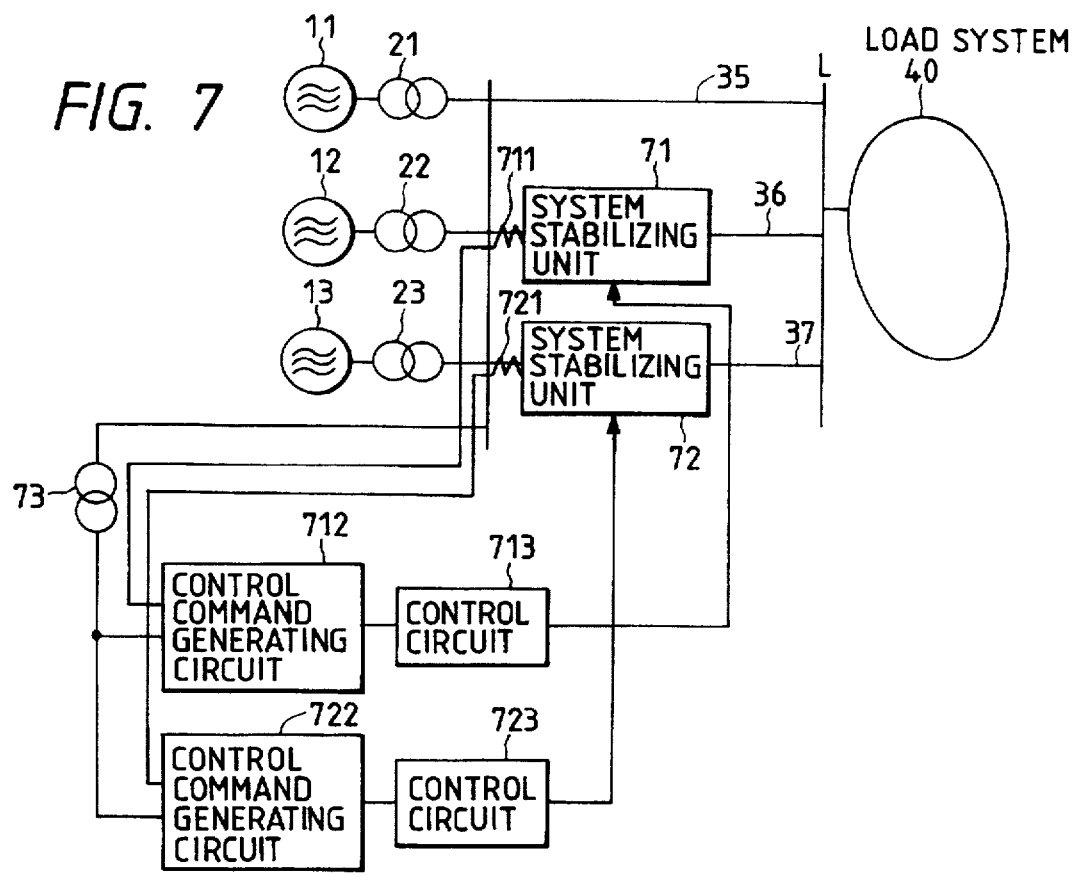
FIG. 7 shows an embodiment of the present invention wherein impedance or phase control type system stabilizing units are applied to a power system including a plurality of generators and transmission lines.

Another embodiment is shown in FIG. 7. In this embodiment, the impedance control type and/or voltage control type system stabilizing units are serially connected in the transmission lines, in the power transmitting system constitution in which the electric power energy generated by a plurality of generators is sent to a load system via a plurality of transmission lines. In the figure, the numerals 11, 12 and 13 indicate a plurality of generators, the numerals 21, 22 and 23 voltage rising transformers, the numerals 35, 36 and 37 a plurality of transmission lines, the numeral 40 a load system including power sources, the numeral 71 an impedance control type (or phase control type) system stabilizing unit, the numeral 72 another impedance control type (or phase control type) system stabilizing unit, the numeral 73 a voltage transformer for detecting the voltage of a bus to which the plurality of generators are connected, the numerals 711 and 721 current transformers, each of them for detecting the current of each one of the transmission lines 36 and 37, the numerals 712 and 722 control command generating circuits for obtaining the power flowing in the transmission lines 36 and 37 and preparing the control commands to suppress the power swings and settle the power to the prescribed level, respectively, and the numerals 713 and 723 control units for outputting control pulse signals based on the control commands, respectively.

The operation of this embodiment in the power transmitting system constitution shown in FIG. 7 is explained in the following. The electric power energy of the three generators connected to a common bus of a sending end is transmitted to the load system 40 via a common bus L connected to the load system. Since the three transmission lines are connected to the sending end and the receiving end, the transmitted power branches and flows in each transmission line according to its impedance. In the power transmitting system constitution in which the power of each generator is transmitted to a load system by one transmission line, the power can not be transmitted if an accident occurs in the transmission line. On the other hand, in this embodiment, an accident in one or two transmission lines does not cause the impossibility of power transmission since the power can be transmitted with the remaining sound transmission lines by removing the transmission line in which an accident is occurring, which improves the reliability of power transmission.

In such a power transmitting system constitution, it is supposed that the impedance of the transmission line 35 becomes lower than the other transmission lines due to some disturbances. Since the transmitted power flows mainly in the transmission line 35, the transmission line goes into the overload state. In the situation, if the system stabilizing units 71 and 72 are the impedance control type ones, they operate so as to decrease the impedances of the transmission lines 36 and 37 when they receive the command of increasing the power in each of the lines. As clear from equation 1, when the impedance X of a transmission line becomes lower, the transmitted power increases, and then, the overload state of the transmission line 35 is relaxed. In this embodiment, since the power generated by the three generators is sent to the load system via the three transmission lines 35, 36 and 37, and the power flowing in the remaining line is uniquely determined if the power flowing through the two lines is controlled and determined, it is not needed that the impedance control type system stabilizing units are provided to all the three transmission lines.

Now suppose that an accident occurs in the load system 40, and the power swings are caused in the transmission lines 35, 36 and 37. In that situation, the control command generating circuits 712 and 722 generate the control commands for suppressing the power swings of the transmission lines 36 and 37. Since the amplitudes of the power swings are equivalent to the acceleration/deceleration of the generators, the power swings can be suppressed by using the control commands obtained based on the detected acceleration/deceleration of the generators. This embodiment settles the power swings by changing the impedance values of the transmission lines so as to suppress the power swings.

Since the impedance control type system stabilizing unit can decrease the impedance of a transmission line, such a system stabilizing unit is effectually applied to a transmission line such as a long didtance line having a large impedance, and has only to compensate statically the large impedance for decreasing the impedance.

Then, in case the system stabilizing units 71 and 72 are the phase control type ones, since the power flowing in the transmission lines can be changed by shifting the phases, the phase control type ones can realize the same control effects as the impedance control type ones, by controlling the phases based on the control commands generated so as mentioned above.

Figure 8:
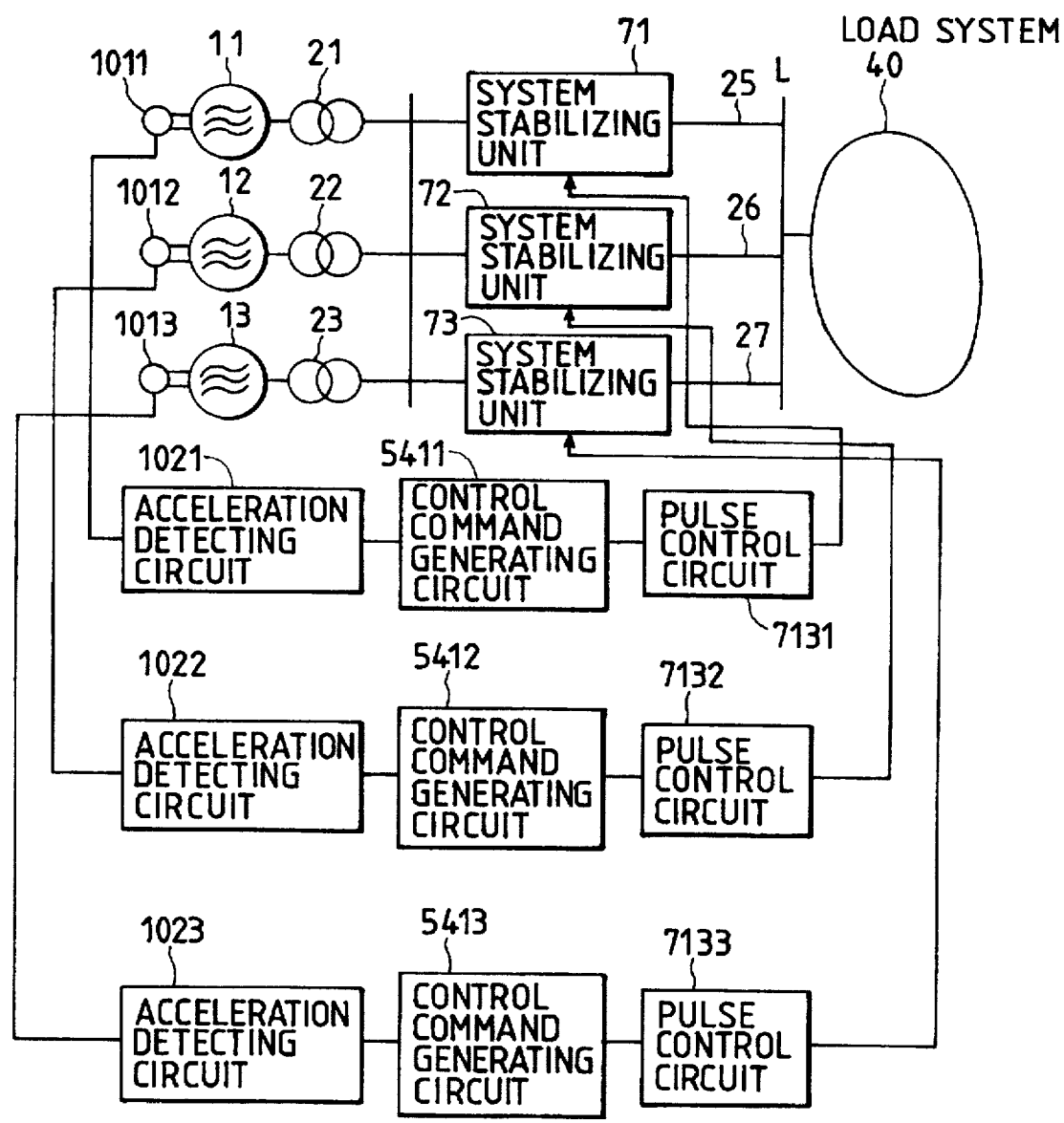
FIG. 8 shows another embodiment of the present invention wherein impedance or phase control type system stabilizing units are applied to a power system including a plurality of generators and transmission lines.

In FIG. 8, is shown an embodiment for increasing the power transmission capacity of the existing power system, in which the impedance control type and/or phase control type system stabilizing units are used to stabilize the power swings. In the figure, the numerals 1011–1013 indicate pilot generators provided at the axes of the generators, each of them for detecting the rotation number of each generator, the numerals 1021–1023 acceleration detecting circuits, each of them for detecting the acceleration/deceleration of each generator by using the detected rotation number, the numerals 5411–5413 control command generating circuits for generating and sending the control commands to the impedance control type (or phase control type) system stabilizing units 71–73, by using the output signals of the acceleration detecting circuits 1021–1023, and the numerals 7131–7133 pulse control circuits for outputting the control pulse signals based on the control commands. The operation of this embodiment is the same as the operation of the one shown in FIG. 2. That is, in the acceleration state of the generator, at least one of the impedance control type (or phase control type system stabilizing units 71–73 is operated so that the power of the generator is absorbed in the power system by decreasing the impedance of the transmission line (increasing the phase angle of the line), and vice versa.

Since the power swings of the generators can be suppressed by this embodiment even in an accident occurrence, the power system can be operated with the increased usual power capacity.

Figure 9:
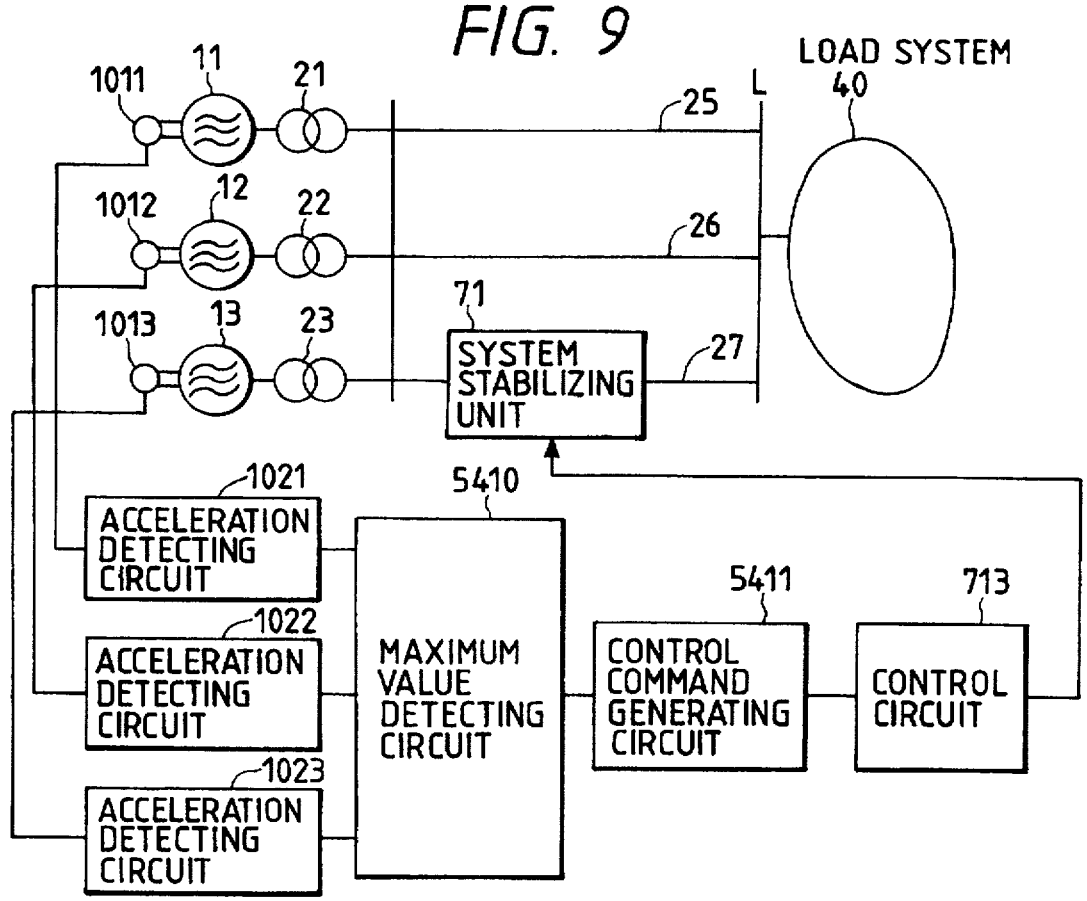
FIG. 9 shows an embodiment of the present invention wherein an impedance or phase control type system stabilizing unit is applied to a power system including a plurality of generators and a transmission line.

Although, in this embodiment, the power system is stabilized by applying one system stabilizing unit to each generator and suppressing the power swing of each generator, it is possible to stabilize the power system including a plurality of generators by using one system stabilizing unit in the power transmitting system constitution shown in FIG. 1. An embodiment realizing the above-mentioned system stabilization is shown in FIG. 9. Then, the necessary power capacity of the power system stabilizing apparatus is larger than that of the embodiment shown in FIG. 8 since the control range of the apparatus becomes wider.

Since the power swings of the generators can be suppressed also by this embodiment even in an accident occurrence, the power system can be operated with the increased usual power capacity.

Figure 10:
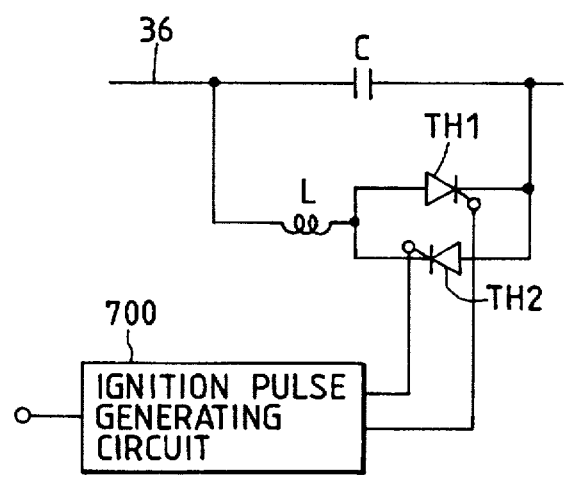
FIG. 10 shows an example composition of the impedance control type system stabilizing unit.

An example composition of the impedance control type system stabilizing unit is shown in FIG. 10. The shown unit is a series capacitor controlled by thyristors. And, the unit is composed of a series capacitor C connected serially in the transmission line 36, a reactor L, and thyristor switches TH1 and TH2. The current flowing in the reactor L is changed by controlling the ignition phase angles of the thyristor switches, which can change equivalently the capacitance of the series capacitor. The numeral 700 indicates an ignition pulse generating circuit which is composed of the control command generating circuit (for example, 712) and the control circuit (for example, 713). Then, by changing the capacitance of the series capacitor by the control of the ignition phase angles of the thyristor switches TH1 and TH2, the impedance of the transmission line 36 can be changed.

Figure 11:
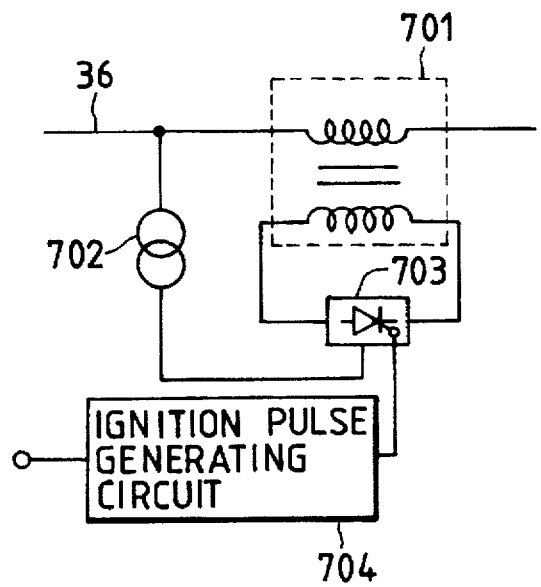
FIG. 11 shows an example composition of the phase control type system stabilizing unit.

Further, an example composition of the phase control type system stabilizing unit is shown in FIG. 11. The shown unit is a phase shifter controlled by a thyristor. And, the numeral 701 indicates a phase-shifting transformer for increasing the voltage of a transmission line by inducing the voltage generated by an inverter at the primary side, in a transmission line at the secondary side, the numeral 702 an insulation transformer for obtaining the power source for the inverter 703 from the transmission line 36, and the numeral 704 an ignition pulse generating circuit which is composed of the control command generating circuit (for example, 712) and the control circuit (for example, 713). Then, since the phase of the voltage at the sending end of the power system can be shifted by generating the voltage having the level and phase in accordance with the control command, by the inverter, the power flowing in the transmission line can be controlled by the phase shifter as clear from equation 1, and the power swings also can be suppressed.

Figure 12:
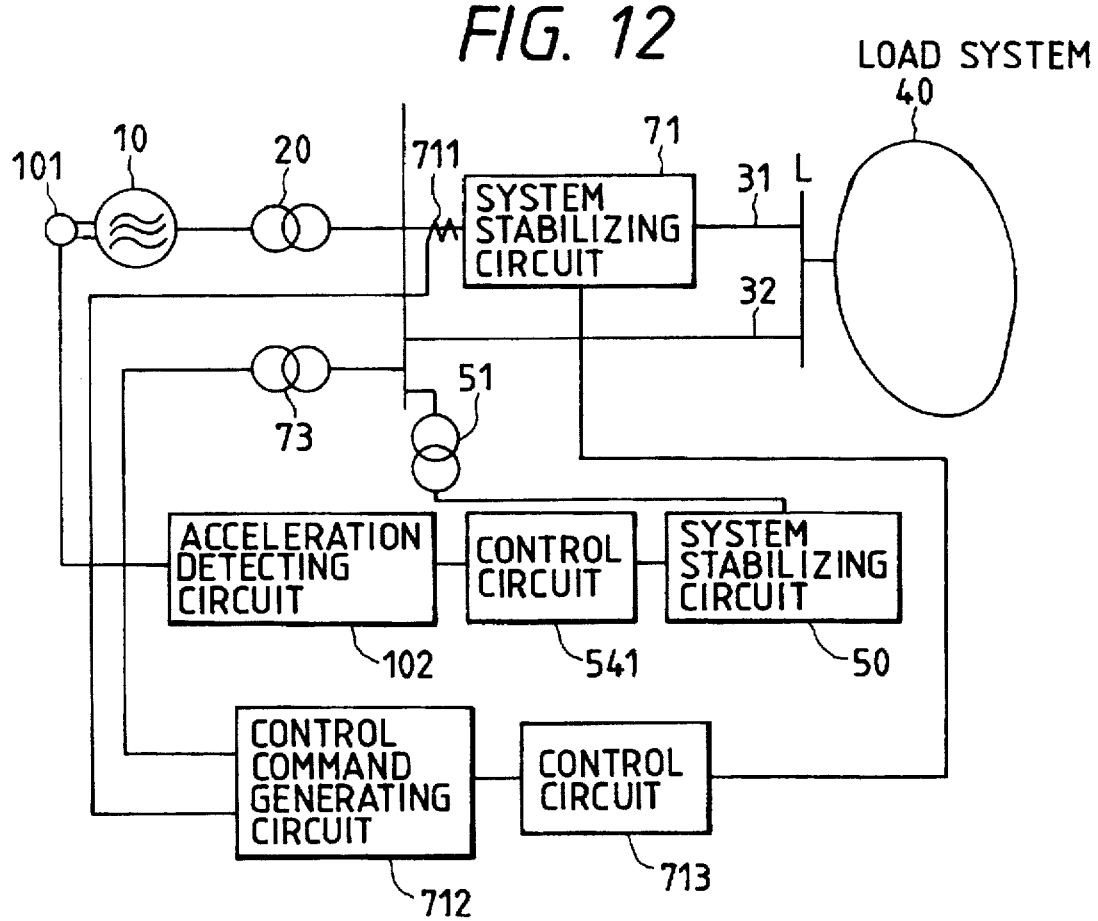
FIG. 12 is an embodiment of the present invention wherein plural types of system stabilizing units are used.

Another embodiment of the present invention is shown in FIG. 12. In this embodiment, the two (a plurality of) power system stabilizing apparatuses are installed in the power transmitting system constitution shown in FIG. 1. In the case, it is expected that adopting the combination of the power system stabilizing apparatuses having the different functions can further improve the system stability by their multiple effect since each apparatus performs its role for increasing the power capacity of the power system. Then, it is supposed that the system stabilizing unit 71 is the impedance control type one. In this embodiment as well as the embodiment shown in FIG. 1, when an accident occurs in the transmission line 32, the control circuit 541 controls the energy control type system stabilizing unit so as to absorb the energy of the generator in the acceleration state of the generator, otherwise discharge the energy. As for the power system stabilizing apparatus using the impedance control type system stabilizing unit, the control circuit 713 controls the system stabilizing unit 71 so that the energy of the generator is absorbed into the power system in the acceleration state of the generator by decreasing the impedance of the transmission line, and vice versa. The acceleration/ deceleration of the generator is measured by obtaining the power changes with the current detected by the current transformer 711 and the voltage detected by the voltage transformer 73, and executing the time differentiation of the obtained power changes. And, the acceleration measuring process is carried out by the control command generating circuit 712. Then, since each one of the power system stabilizing apparatuses having the different functions performs its role as explained above, in the power transmitting system constitution to which this embodiment is applied, the power swings due to an accident occurrence in the power system can be quickly suppressed, and then the system stability is improved. In comparing with the embodiment shown in FIG. 1, in which only one energy control type system stabilizing unit is used, this embodiment in which the impedance control type system stabilizing unit is further used, can more quickly suppress the power swings, and reduce the needed power capacity of the system stabilizing units.

Although the system stabilizing unit is an impedance control type one in the above explanation, adopting a phase control type one can produce the same effects. Further, the modification of system constitution shown in FIG. 12, wherein a voltage control type system stabilizing unit is connected to the load system connection point L, is also available, and can also produce the better stability of the power system in comparing with the case in which only one system stabilizing unit is used.

Further, although the system stabilizing unit 71 is provided only at the transmission line 31 in FIG. 12, it is obviously necessary to provide another one at the transmission line 32, in supposing also the case of an accident occurrence in the transmission line 31.

Figure 13:
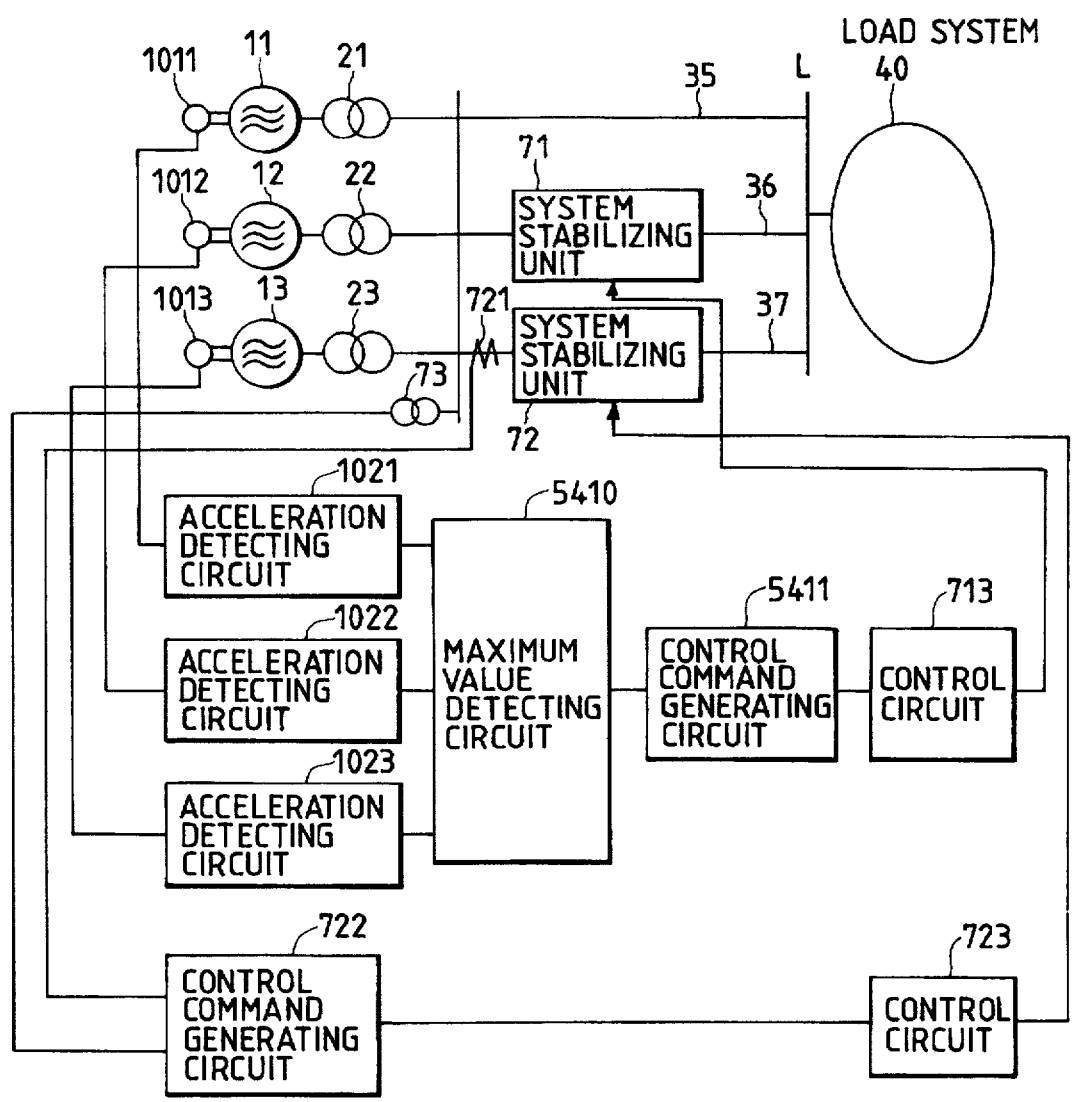
FIG. 13 is another embodiment of the present invention wherein impedance or phase control type system stabilizing units are applied to a power sytem including a plurality of generators and transmission lines.

And, the like embodiment as mentioned above, in which also the combination of the power system stabilizing apparatuses having the different functions is adopted, is shown in FIG. 13.

In the power transmitting system constitution shown in FIG. 13, the function of the embodiment shown in FIG. 7 wherein the power-flow in the transmission lines is controlled by the power system stabilizing apparatus using the impedance control type system stabilizing unit and the function of the embodiment shown in FIG. 9 wherein the power swings of the generators are stabilized, are combined, which improves the system stability and increases the transmission power further more than the embodiment shown in FIG. 7 or the embodiment shown in FIG. 9. In the figure, the numerals 1011–1013 indicate pilot generators provided at the axes of the generators, each of them for detecting the rotation number of each generator, the numerals 1021–1023 acceleration detecting circuits, each of them for detecting the acceleration/deceleration of each generator by using the detected rotation number, the numeral 5410 a maximum value detecting circuit for detecting the maximum value of the outputs of the acceleration detecting circuits 1021–1023, the numeral 5411 a control command generating circuit for generating and sending the control commands to the impedance control type (or phase control type) system stabilizing unit 71, by using the output signals of the acceleration detecting circuits 1021–1023, and the numeral 713 a pulse control circuit for outputting the control pulse signals based on the control commands. The operation of this embodiment is the same as the operation of the one shown in FIG. 2. That is, in the acceleration state of the generator, at least one of the impedance control type (or phase control type) system stabilizing units 71–73 is operated so that the power of the generator is absorbed in the power system by decreasing the impedance of the transmission line (increasing the phase angle of the line), and vice versa. Further, the impedance control type (phase control type system stabilizing unit 72 is adequate to stabilize the power system by sharing the control roles with the system stabilizing unit 71. Then, the operations of the system stabilizing unit 72 is the same as the operations in the embodiment shown in FIG. 7, that is, the operations for controlling the power-flow in the transmission lines. Since the stable power transmission without a shutdown can be realized by this embodiment even in an accident occurrence, the power system can be operated with the increased usual power capacity.

By the present invention, the usual transmitted power in the existing power system can be increased without laying a new transmission line, by providing the system stabilizing units to which the power electronics technique is applied, in the power system, adequately corresponding to the control characteristics or function of each type of one of the system stabilizing units.

What is claimed is:

1. A power system stabilizing apparatus for a power system in which generators are connected to load systems, comprising:

at least a semiconductor switch for stabilizing said power system;

means for controlling said semiconductor switch so as to stabilize power swings of said power system, corresponding to operation states of said power system;

an acceleration detecting circuit for detecting an acceleration and deceleration of at least one of said generators, by which occurrence of power swings is monitored and detected, based on changes of said detected acceleration and deceleration; and wherein said controlling means controls said semiconductor switch, corresponding to said detected acceleration.

2. A power system stabilizing apparatus according to claim 1, wherein means, controlled by said semiconductor switch, for absorbing and discharging electric power energy is provided.

3. A power system stabilizing apparatus according to claim 2, wherein said electric power energy absorbing and discharging means absorbs electric power energy, corresponding to operation states of one of said generators, which has a maximum acceleration, and discharges electric power energy, corresponding to operation states of one of said generators, which has a maximum absolute value of a deceleration.

4. A power system stabilizing apparatus according to claim 2, wherein said electric power energy absorbing and discharging means is provided in parallel with said power system.

5. A power system stabilizing apparatus according to claim 4, wherein said electric power energy absorbing and discharging means is provided at a sending end of said generators.

6. A power system stabilizing apparatus according to claim 5, further including a power transmission state detecting circuit provided at a side of said load systems connected to said sending end of said generators via a transmission line system, wherein said controlling means controls said semiconductor switch by using a power transmission state detected by said power transmission state detecting circuit and said acceleration of said at least one of said generators.

7. A power system stabilizing apparatus according to claim 1, wherein means, controlled by said semiconductor switch, for controlling an impedance of a transmission line system is provided.

8. A power system stabilizing apparatus according to claim 7, wherein said acceleration detecting circuit detects said acceleration and deceleration of at least two generators, and said control means controls said semiconductor switch, corresponding to operation states of one of said generators, which has a maximum absolute value of an acceleration and deceleration.

9. A power system stabilizing apparatus according to claim 1, wherein means, controlled by said semiconductor switch, for controlling a phase of power flowing in a transmission line system is provided.

10. A power system stabilizing apparatus according to claim 9, wherein said acceleration detecting circuit detects said acceleration and deceleration of at least two generators, and said control means controls said semiconductor switch, corresponding to operation states of one of said generators, which has a maximum absolute value of acceleration and deceleration.

11. A power system stabilizing apparatus according to claim 1, which includes means for absorbing and discharging electric power energy and means for controlling an impedance of a transmission line system, said electric power energy absorbing add discharging means and said impedance control means being controlled by said semiconductor switch.

12. A power system stabilizing apparatus according to claim 11, wherein said impedance control means is serially provided at said power system, means for detecting operation states of said power system is provided, and said electric power energy absorbing and discharging means and said impedance control means are controlled by using said acceleration and deceleration of said generator detected by said acceleration detecting circuit, and said operation states of said power system detected by said operation state detecting means.

13. A power system stabilizing apparatus according to claim 2, which includes means for absorbing and discharging electric power energy and means for controlling a phase of power flowing in a transmission line system, said electric power absorbing and discharging means and said phase control means being controlled by said semiconductor switch.

14. A power system stabilizing apparatus according to claim 13, wherein said phase control means is serially provided at said power system, means for detecting operation states of said power system is provided, and said electric power energy absorbing and discharging means and said phase control means are controlled by using said acceleration and deceleration of said generator detected by said acceleration detecting circuit, and said operation states of said power system detected by said operation state detecting means.

15. A power system stabilizing apparatus for a power system in which generators are connected to load systems, comprising:
   at least a semiconductor switch used for stabilizing said power systems;
   means for controlling said semiconductor switch so as to stabilize power swings of said power system, corresponding to operation states of said power system;
   means for detecting voltage changes of said power system, by which occurrence of power swings is monitored and detected based on changes of said detected voltage changes; and
   wherein said controlling means controls said semiconductor switch, corresponding to said detected voltage changes.

16. A power system stabilizing apparatus according to claim 15, wherein means, controlled by said semiconductor switch, for controlling a reactive power flowing in a transmission line system is provided.

17. A power system stabilizing apparatus according to claim 16, wherein said reactive power control means outputs a lead reactive power if a voltage detected by said voltage change detecting means is lower than a prescribed level, and a lag reactive power if said detected voltage is higher than said prescribed level.

18. A power system stabilizing apparatus according to claim 16, wherein said reactive power control means is provided at a midway point of said transmission line system of said power system, and said voltage change detecting means is provided at said midway point.

19. A power system stabilizing apparatus according to claim 18, wherein another voltage change detecting means is provided at a place besides said midway point, and said voltages detected by said two voltage change detecting means are input to said reactive power control means.

20. A power system stabilizing apparatus for a power system in which generators are connected to load systems, comprising:
   at least a semiconductor switch used for stabilizing said power systems;
   means for controlling said semiconductor switch so as to stabilize power swings of said power systems, corresponding to operation states of said power system;
   means for detecting transmitted power changes of said power system; and
   wherein said controlling means controls said semiconductor switch, corresponding to said transmitted power changes detected by said transmitted power change detecting means.

21. A power system stabilizing apparatus according to claim 20, wherein means, controlled by said semiconductor switch, for controlling an impedance of a transmission line system is provided.

22. A power system stabilizing apparatus according to claim 21, wherein, said power system has at least two parallel transmission lines connecting said generators and load systems, and said impedance control means is provided at least at one of said transmission lines.

23. A power system stabilizing apparatus according to claim 22, wherein said impedance control means is provided at each one of said transmission lines.

24. A power system stabilizing apparatus according to claim 20, wherein means, controlled by said semiconductor switch, for controlling a phase of power flowing in a transmission line system is provided.

25. A power system stabilizing apparatus according to claim 24, wherein, said power system has at least two parallel transmission lines connecting said generators and said load systems, and said impedance control means is provided at least at one of said transmission lines.

26. A power system stabilizing apparatus according to claim 25, wherein said impedance control means is provided at each one of said transmission lines.

27. A power system stabilizing apparatus according to claim 1, wherein a cycloconverter is used as said semiconductor switch.

28. A power system stabilizing apparatus according to claim 1, wherein a gate-turn-off thyristor (GTO) element is used as said semiconductor switch.

29. A power system stabilizing apparatus according to claim 1, wherein an insulated gate-turn-off bipolar transistor (IGBT) element is used as said semiconductor switch.

30. A power system stabilizing apparatus for a power system in which generators are connected to load systems, comprising:
   at least a semiconductor switch used for stabilizing said power systems;
   means for controlling said semiconductor switch so as to stabilize power swings of said power system, corresponding to operation states of said power system; and
   an energy control type system stabilizing unit with which said semiconductor switch is used, provided at a sending end of a power plant in parallel with a transmission line system connecting a power plant and said load systems, and an acceleration detecting circuit for detecting an acceleration and deceleration of at least one of said generators, wherein said power system is stabilized and power swings are suppressed, by absorbing electric power energy in an acceleration state of said generator and discharging electric power energy in a deceleration state of said generator, by operating said system stabilizing unit.

31. A power system stabilizing apparatus for a power system in which generators are connected to load systems, comprising:
   at least a semiconductor switch used for stabilizing said power systems;

means for controlling said semiconductor switch so as to stabilize power swings of said power system, corresponding to operation states of said power system; and a voltage control type system stabilizing unit with which said semiconductor switch is used, provided at one point of a load system connection point and a midway point between a power plant and said load systems, in parallel with a transmission line connecting said power plant and said load systems, and a voltage detecting circuit for detecting a voltage of said point at which said voltage control type system stabilizing unit is provided, wherein said power system is stabilized and power swings are suppressed, by controlling a voltage of said transmission line by executing absorption of a lead reactive power if said detected voltage is lower than a prescribed level, and of a lag reactive power if said detected voltage is higher than a prescribed level, by operating said system stabilizing unit.

32. A power system stabilizing apparatus for a power system in which generators are connected to load systems, comprising:

at least a semiconductor switch used for stabilizing said power systems;

means for controlling said semiconductor switch so as to stabilize power swings of said power system, corresponding to operation states of said power system; and one system of a phase control type system stabilizing unit and an impedance control type system stabilizing unit to which said semiconductor switch is used, serially provided in at least one of a plurality of transmission lines connecting said power plant and said load systems via buses, and a power detecting circuit for detecting a power flowing in said transmission line, wherein said power system is stabilized and power swings are suppressed, by controlling a power-flow of said power system so as to keep a prescribed value, by operating said system stabilizing unit.

33. A power system stabilizing apparatus for a power system in which generators are connected to load systems, comprising:

at least a semiconductor switch used for stabilizing said power systems;

means for controlling said semiconductor switch so as to stabilize power swings of said power system, corresponding to operation states of said power system; and an impedance control type system stabilizing unit to which said semiconductor switch is used, serially provided in a transmission line of a high impedance, and an acceleration detecting circuit for detecting an acceleration and deceleration of at least one of said generators, wherein said power system is stabilized and power swings are suppressed, by absorbing electric power energy in an acceleration state of said generator and discharging electric power energy in a deceleration state of said generator, by operating said system stabilizing unit.

34. A power system stabilizing apparatus for a power system in which generators are connected to load systems, comprising:

at least a semiconductor switch used for stabilizing said power systems;

means for controlling said semiconductor switch so as to stabilize power swings of said power system, corresponding to operation states of said power system; and a combination of an energy control type system stabilizing unit, a voltage control type system stabilizing unit and an impedance control type system stabilizing unit, having different functions and control rolls, with each of which said semiconductor switch is used, provided at transmission lines to be controlled, wherein said power system is stabilized and power swings are suppressed, by controlling a power-flow of said power system, by operating said semiconductor switch in accordance with a stabilizing command signal obtained by using detected state values of said power system.

35. A power system stabilizing apparatus according to claim 30, wherein said power system is stabilized and power swings are suppressed, by operating said semiconductor switch in accordance with a stabilizing command signal obtained by using detected state values of said power system, within 3 cycles after removal of an accident occurring in said power system.

36. A power system stabilizing apparatus according to claim 30, said apparatus having a power capacity more than a difference between a power transmission capacity determined by a static stability and one determined by a transient stability, of said power system.

37. A power system stabilizing apparatus according to claim 30, said apparatus having a power capacity more than a power transmission capacity required to be increased for said power system.

38. A power system stabilizing apparatus according to claim 30, wherein a stabilizing command signal for operating a control unit of said apparatus is generated by using state values of said power plants, a transmission line system, said load systems and power sources.

\* \* \* \* \*